United States Patent
Needham

(10) Patent No.: US 6,628,831 B1
(45) Date of Patent: Sep. 30, 2003

(54) DARKNESS-DETECTING WEB CAMERA SYSTEM

(75) Inventor: Bradford H. Needham, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/416,486

(22) Filed: Oct. 12, 1999

(51) Int. Cl.⁷ .................................................. G06K 9/00
(52) U.S. Cl. ......................... 382/168; 382/274; 348/603
(58) Field of Search ................................. 382/168–172, 382/274, 254, 275; 348/143, 207.1, 207.11, 602, 603, 604, 607, 227, 229; 725/32–36; 358/518–523; 709/200–211

(56) References Cited

U.S. PATENT DOCUMENTS 4,710,822 A * 12/1987 Matsunawa ................. 382/172
6,229,577 B1 * 5/2001 Barth et al. .................. 348/602

FOREIGN PATENT DOCUMENTS

WO     02/08860 A3 *  1/2002  ........... H04N/5/225

OTHER PUBLICATIONS

Loui et al., Automatic event segmentation and Quality Screening, Jul. 2000, IEEE, Multimedia expo, 1–4.*

* cited by examiner

Primary Examiner—Leo Boudreau
Assistant Examiner—Ishrat Sherali
(74) Attorney, Agent, or Firm—Blakely, Sokoloff, Taylor & Zafman LLP

(57) ABSTRACT

A web camera system and a method of operating the same, the system including a computer connected to a video camera that outputs a captured image. A program runs on the computer to generate a histogram that provides a distribution of pixel intensities associated with the image. A static image indicating a low contrast image is uploaded to the web server when a width of the distribution is less than a predetermined threshold value; otherwise, the captured image is uploaded to the web server.

21 Claims, 3 Drawing Sheets

DARKNESS-DETECTING WEB CAMERA SYSTEM

FIELD OF THE INVENTION

The present invention relates generally to the field of Internet software applications; more particularly, to web systems that provide the capability to upload digital information to a web page.

BACKGROUND OF THE INVENTION

A web camera (i.e., "webcam") system consists of a video camera plus software that runs on a personal computer to periodically upload an image from the camera to a web page. The basic purpose of a web camera system is to post a reasonably live picture on a user-specified web page. Many webcam systems upload images on a periodic basis; for example, uploading an image once per hour. People use the cameras to show live pictures of, among other things, offices, homes, and backyards.

FIG. 1 illustrates a typical web camera system 10 that includes a video camera 11, personal computer (PC) 12, and a web server 13. Video camera 11. outputs a captured video image to PC 12. Software running on PC 12 operates to periodically upload the captured video image to an Internet web page (i.e., web server 13). Internet service providers (ISPs) commonly provide their patrons with a certain allocation of web page space for personal use. This allows the user to upload images onto their web page periodically; with the frequency of uploading being dependent on the particular type of connection offered by the ISP.

Presently, there are two shareware products in existence that relate to web cameras: Ispy™ and Webcam32™. The Ispy webcam software functions to grab video images, save them as JPEG files, and then send the saved images automatically to a user-specified home page via the connection provided by the users' ISP. Ispy runs under WindoWs™ 95, Windows 98 and Windows NT 4.0; it also works with any video for Windows-compatible cameras and frame grabbers. Webcam32 is a Windows 95, Windows 98 and Windows NT application that allows video camera images to be displayed within a Web page. Like Ispy, Webcam32 software is able to upload images to a web server to allow images to be obtained directly from the page.

Both of these products include various simple image-processing features such as captioning of photos, day/time stamping, and text additions. Both products give the user choice either running according to a preset schedule, or uploading images based on rudimentary motion detection. For example, it is possible to establish a schedule wherein no uploads occur before 8 a.m. or after 8 p.m. This type of schedule is suitable for, say, an office environment, where there is regular activity occurring during the predetermined schedule times.

The trouble with both of these products is that there are certain instances where uploading according to a predetermined schedule does not work well. One case is an office environment where regular work hours are not kept. Another problem arises when the times of sunrise and sunset change with the changing of the seasons. This latter problem is more pronounced at locations having a high latitude.

Some web camera systems capture a live image 24-hours a day, uploading a totally dark picture when the office lights are turned off, or when the sun has set. In some cases, these systems upload a solid blue or green image whenever the camera is turned off. Avoiding image capture during certain times, however, doesn't solve the aforementioned problems because the time of sunrise and sunset can vary dramatically during the year. In addition, the camera owner might turn off the camera at any time during the day.

Therefore, what is needed is a web camera system that is capable of detecting a dark image, or when the user is turned the camera off, assuring that. only interesting pictures appear on the user's web page.

SUMMARY OF THE INVENTION

The present invention, in one embodiment, comprises a method of operation for a web camera system. The method includes generating an intensity histogram from an image captured by a video camera. The intensity histogram provides a distribution of pixel intensities across a range from a minimum to a maximum intensity. The image is marked as having low contrast when a width of the distribution is less than a predetermined threshold value.

BRIEF DESCRIPTION OF THE DRAWINGS

The present invention will be understood more fully from the detailed description which follows and from the accompanying drawings, which however, should not be taken to limit the invention to the specific embodiments shown, but are for explanation and understanding only.

DETAILED DESCRIPTION

A darkness-detecting web camera system is described. In the following description, numerous specific details are set forth, such as specific operating modes, algorithms, settings, etc., in order to provide a thorough understanding of the invention. It will be obvious, however, to one skilled in the art, that these specific details may not be needed to practice the present invention.

The present invention comprises a web camera system that generates an intensity histogram measurement of a potentially uploadable image. The software program marks the image as having low-contrast (i.e., "dark") when the intensity histogram is narrower than a predetermined threshold value. At the user's option, the dark image may be replaced by a static image of the user's choice. For example, the static image may simply contain the text, "Please come back tomorrow". Another option is to not upload the dark image.

Figure 1:
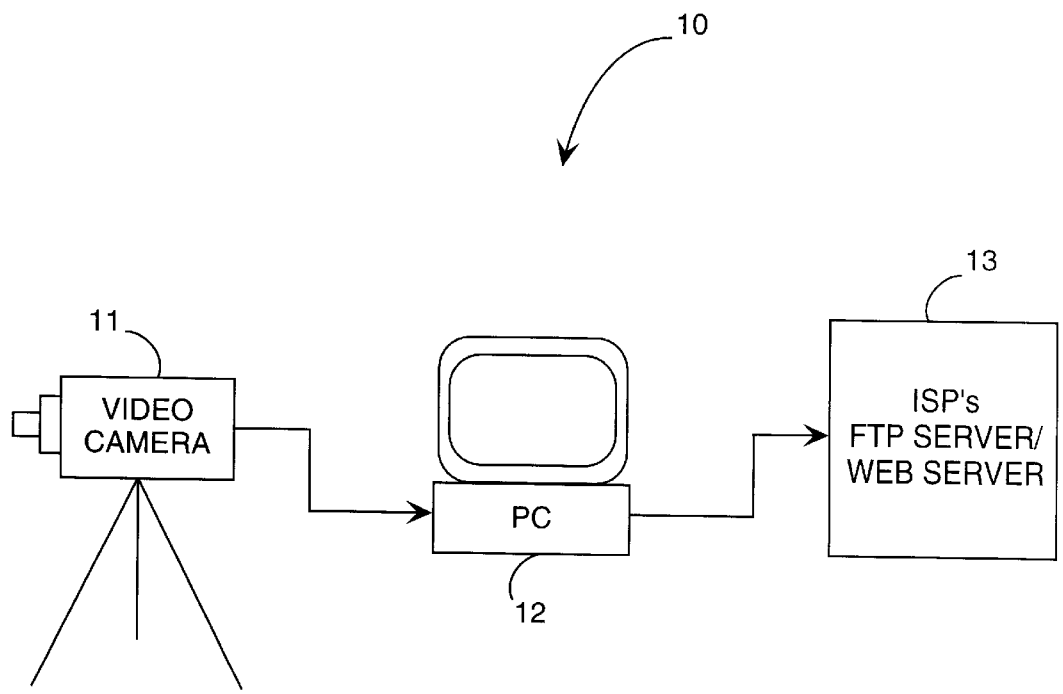
FIG. 1 is a diagram of a typical web camera system.
Figure 2:
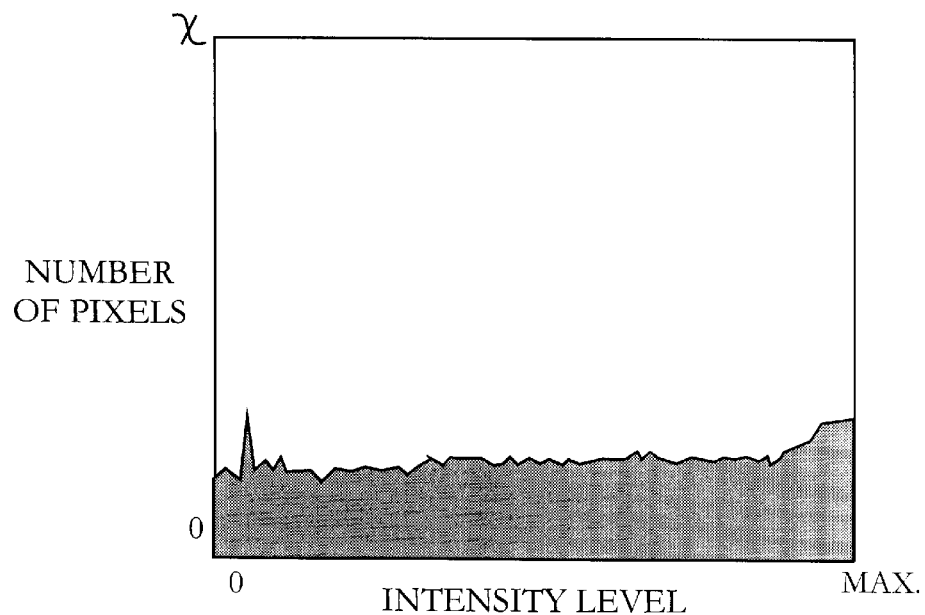
FIG. 2 illustrates an intensity histogram associated with a normal image.

FIG. 2 is an example of an intensity histogram associated with a normally illuminated live picture. The intensity level extends from zero to a maximum level (e.g., 255) along the horizontal axis. The vertical axis indicates the number of pixels in the image at each discrete intensity level. The range of vertical axis is from zero to X, which represents the total number of pixels in the image. As can be seen, the intensity histogram of a normally illuminated live picture results in a relatively even distribution of pixel intensities. That is, the number of pixels at each discrete intensity level in the range from a minimum to a maximum intensity is fairly even. This is referred to as a broad distribution of intensities.

Note that the term "intensity" simply refers to the brightness level or value associated with a given pixel. This term may also denote the luminescence of the pixels within the image.

Figure 3:
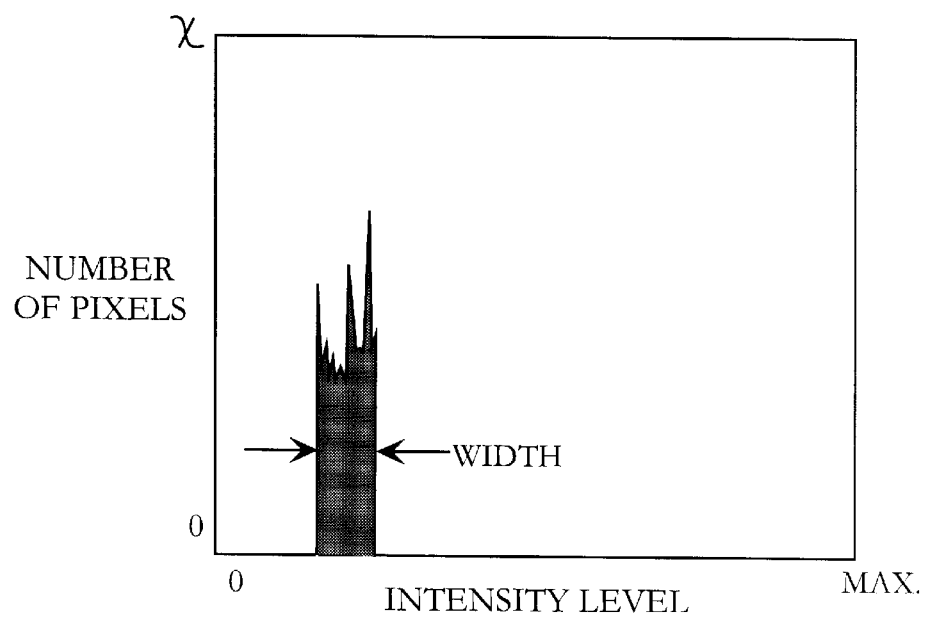
FIG. 3 illustrates an intensity histogram associated with a low contrast image.

FIG. 3 is an intensity histogram associated with a low-contrast image. In this example, the distribution of pixel intensities is bunched together near the lower end of the range of intensity levels. It may be said that the width of the intensity distribution, taken along the horizontal axis, is relatively narrow. The width may be defined by finding the minimum and maximum intensity levels where the number of pixels exceeds a certain percentage (e.g., 5%) of the total number of pixels in the image. This percentage may be commonly be used to filter out background noise. In other words, when the number of pixels at a particular intensity level is below the certain percentage, this intensity level is simply ignored for purposes of determining the width of the intensity distribution. In accordance with one embodiment of the present invention, the image is marked as having low-contrast when the width of the intensity distribution is less than a predetermined threshold value. For example, if the range of intensity values is 0–255, a width having a value less than 50 may result in the image being marked as having low-contrast.

As FIG. 3 shows, large numbers of pixels are grouped near the low-end of the histogram, indicating that a low-contrast, dark image has been detected. Is also possible to have a narrow distribution of pixel intensities grouped together near the high-end of the intensity range. In such a case, the image may still be marked as having low-contrast when the width is less that a predetermined threshold value even though the overall image is bright rather than dark. This latter case represents a "bright-but-low-contrast" or "white-out" video image.

In a situation where the video camera is turned off, the intensity histogram may consist of a single line of height X at the zero intensity level. Some cameras produce a fully-saturated picture when the camera is off In either case, since all pixels in the image are the same intensity level (i.e., the minimum and maximum intensity levels are equal) the intensity histogram is labeled as having low-contrast. In the case where the minimum and maximum intensity levels are identical, the system may distinguish this situation from the typical low-contrast image and optionally upload a static image indicating that the camera is presently turned off.

Figure 4:
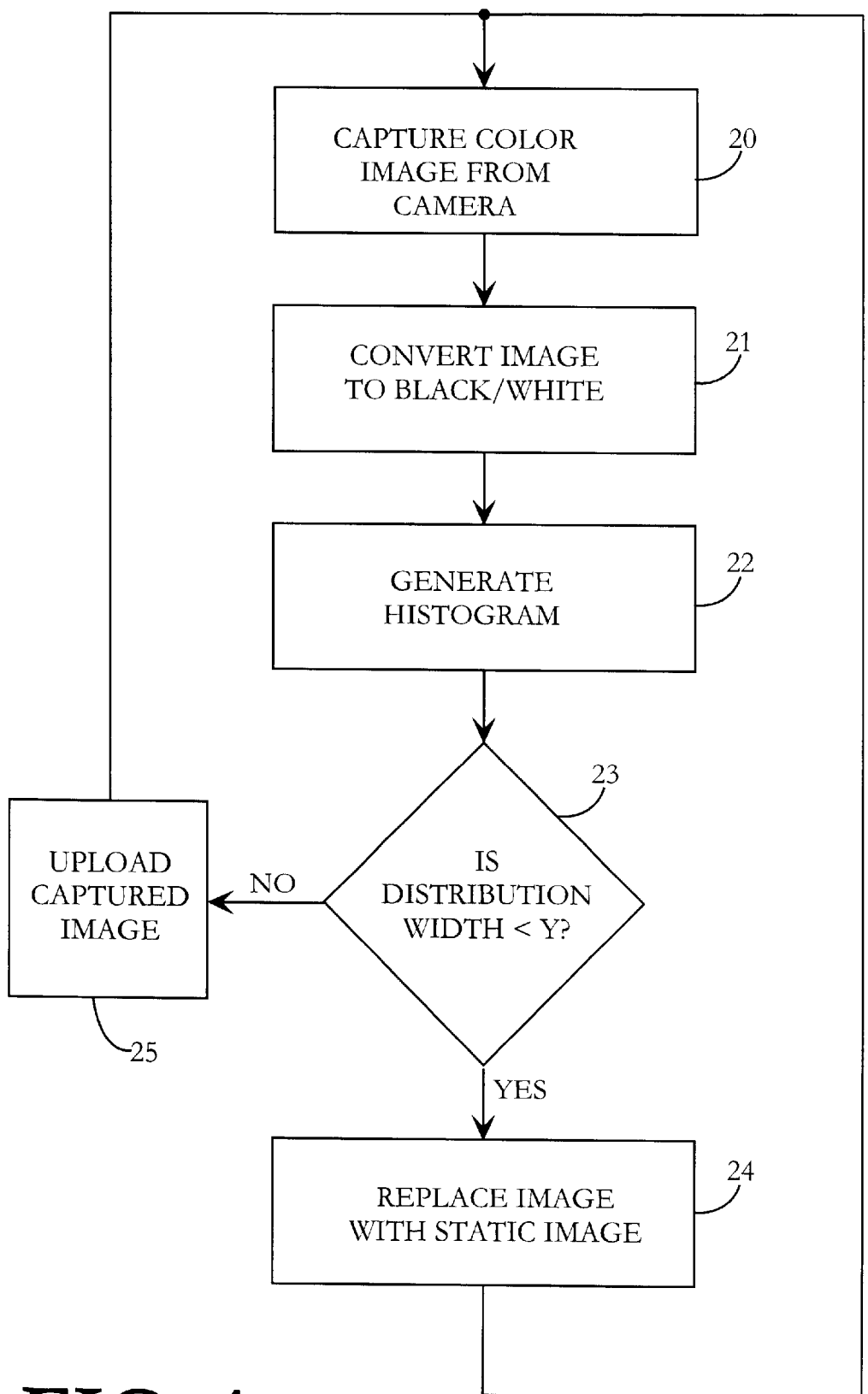
FIG. 4 is a flowchart illustrating one embodiment of the present invention.

FIG. 4 is a flow chart illustrating a method of operating a web camera system in accordance with one embodiment of the present invention. The flow chart begins with the capture of a color image from the video camera, indicated by box 20. Next, the color image is converted into a black and white pixel representation (box 21). At this point, the intensity histogram is generated (box 22) from the image by plotting the number of pixels at each of a plurality of discrete intensity levels, from a lowest to a highest intensity level. As discussed previously, a filtering algorithm may be utilized to discard pixel counts that cannot be distinguished from background noise. The result is an intensity histogram with a distribution of pixel intensities.

At decision box 23, the width of the distribution is calculated and compared against a predetermined threshold value (e.g., Y). The width is defined as the difference between the minimum and maximum intensity levels that exceed a certain percentage of the total number of pixels. If the width of the distribution is greater than or equal to the threshold value (i.e., a broad distribution), the algorithm proceeds to box 25, and the captured image may be uploaded to the web server. On the other hand, if the:width of the distribution is less than the threshold value (i.e., a narrow distribution), the captured image is replaced with an appropriate static image (box 24). In either case, the program returns to box 20, representing the capture of another image from the camera.

Certain scenes consist of a generally dark image with the localized light at one region of the scene. An example is a night scene with the street light in the corner of the camera's field of view. This type of scene produces an intensity histogram having a bi-modal distribution where the difference between the two peaks of the distribution is wider than the predetermined threshold value. Yet it may still be desirable to mark such a scene as having low-contrast. This requires a different type of histogram generating algorithm. To identify an image with a bi-modal distribution as having low contrast the following algorithm may be utilized. First, a minimum intensity value having a pixel count above a certain percentage (for background noise filtering purposes) of the total number of pixels is found. Incrementing along the horizontal axis of the histogram, the program next measures the number of pixels at the next higher intensity level where the pixel count also exceeds the certain percentage. The number of pixels at the next higher intensity level is added to the number of pixels found at the minimum intensity value, thereby producing a current pixel sum. This process is repeated at progressively higher intensity levels until the current pixel. sum exceeds a fixed percentage of all the pixels in the image (e.g., 70%). If the fixed percentage of all the pixels is within some narrow range (<Y) it is marked as having low contrast. Thus, it can be determined whether a particular image is predominantly dark, regardless of a spike in the histogram distribution at a relatively high intensity level.

When an image is marked as having low-contrast, the program uploads an appropriate user-specified static image to the web server, indicating either that the camera is turned off, or that an uninteresting ("low-contrast") image is present. Otherwise, when the image is not marked as having low-contrast the program simply uploads the captured image to the web server.

I claim:

1. A method of operation for a web camera system comprising:

generating an intensity histogram from a single image captured by a video camera, the intensity histogram providing a distribution of individual pixel intensities for the entire image;

finding a minimum intensity level where a count of pixels at that intensity level exceeds a certain number;

incrementing to consecutively higher intensity levels and adding the count of pixels at each of those intensity levels together, resulting in a pixel sum;

finding a maximum intensity level where the sum of the pixels between the minimum intensity level and the maximum intensity level exceeds a certain number;

marking the image as having low contrast when a width of the distribution between the minimum intensity level and the maximum intensity level is less than a predetermined threshold value.

2. The method of claim 1 wherein generating the intensity histogram comprises:

counting the number of pixels in the image for each of a plurality of discrete intensity levels having a range from a lowest intensity level to a highest intensity level.

3. The method of claim 2 wherein finding a minimum intensity level where a count of pixels at that intensity level exceeds a certain number comprises:

finding a minimum intensity level where a count of pixels at that intensity level exceeds a certain fixed percentage of all the pixels in the image.

4. The method of claim 1 wherein finding a maximum intensity level where the sum of the pixels between the minimum intensity level and the maximum intensity level exceeds a certain number comprises:

finding a maximum intensity level where the sum of the pixels between the minimum intensity level and the maximum intensity level exceeds a certain fixed percentage of all the pixels in the image.

5. The method of claim 1 further comprising:

uploading a static image to a web server when the image is marked as having low contrast.

6. The method of claim 2 further comprising:

uploading a static image to a web server when the image is marked as having low contrast.

7. The method of claim 3 further comprising:

uploading a static image to a web server when the image is marked as having low contrast.

8. The method of claim 4 further comprising:

uploading a static image to a web server when the image is marked as having low contrast.

9. A method of operation for a web camera system comprising:

capturing a single image from a video camera;

generating an intensity histogram from the image captured in which a horizontal axis indicates a plurality of discrete intensity levels having a range from a lowest intensity level to a highest intensity level, at a given intensity level a vertical axis indicating a number of pixels in the image having the given intensity level, the intensity histogram thereby providing a distribution of individual pixel intensities for the entire image;

finding a minimum intensity level where a count of pixels at that intensity level exceeds a certain number;

incrementing to consecutively higher intensity levels and adding the count of pixels at each of those intensity levels together, resulting in a pixel sum;

finding a maximum intensity level where the sum of the pixels between the minimum intensity level and the maximum intensity level exceeds a certain number;

marking the image as having low contrast when a width of the distribution between the minimum intensity level and the maximum intensity level is less than a predetermined threshold value; and uploading a static image to a web server when the image is marked as having low contrast; otherwise, uploading the image to a web server.

10. The method of claim 9 wherein generating the intensity histogram comprises:

counting the number of pixels in the image at each of a plurality of discrete intensity levels within the range.

11. The method of claim 10 wherein finding a minimum intensity level where a count of pixels at that intensity level exceeds a certain number comprises:

finding a minimum intensity level where a count of pixels at that intensity level exceeds a certain fixed percentage of all the pixels in the image.

12. The method of claim 10 wherein finding a maximum intensity level where the sum of the pixels between the minimum intensity level and the maximum intensity level exceeds a certain number comprises:

finding a maximum intensity level where the sum of the pixels between the minimum intensity level and the maximum intensity level exceeds a certain fixed percentage of all the pixels in the image.

13. The method of claim 10 wherein the distribution is a bimodal distribution.

14. The method of claim 9 further comprising, after capturing the image, converting the image to black and white.

15. A web camera system for uploading images to a web server comprising:

a computer;

a video camera that outputs an image to the computer;

a program that runs on the computer to generate a histogram that provides a distribution of individual pixel intensities associated with the entire image, the program finding a minimum intensity level where a count of pixels at that intensity level exceeds a certain number, the program incrementing to consecutively higher intensity levels and adding the count of pixels at each of those intensity levels together, resulting in a pixel sum, the program finding a maximum intensity level where the sum of the pixels between the minimum intensity level and the maximum intensity level exceeds a certain number, the program uploading a static image to the web server when a width of the distribution between the minimum intensity level and the maximum intensity level is less than a predetermined threshold value; otherwise, the program operating to upload the image to the web server.

16. The web camera system of claim 15 wherein the program uploads either the static image or the image on a periodic basis.

17. The web camera system of claim 15 wherein the histogram includes a number of pixels in the image at each of a plurality of discrete intensity levels within a range from a lowest intensity level to a highest intensity level.

18. The web camera system of claim 17 wherein finding a minimum intensity level where a count of pixels at that intensity level exceeds a certain number comprises:

finding a minimum intensity level where a count of pixels at that intensity level exceeds a certain fixed percentage of all the pixels in the image.

19. The web camera system of claim 17 wherein finding a maximum intensity level where the sum of the pixels between the minimum intensity level and the maximum intensity level exceeds a certain number comprises:

finding a maximum intensity level where the sum of the pixels between the minimum intensity level and the maximum intensity level exceeds a certain fixed percentage of all the pixels in the image.

20. A web camera system for uploading images to a web server comprising:

a computer;

a video camera that outputs an image to the computer;

a program that runs on the computer to generate a histogram that provides a distribution of individual pixel intensities associated with the entire image, the program identifying the image as having low contrast by:

finding a minimum intensity level where a count of the pixels at that intensity level exceeds a certain number;

incrementing to a next higher intensity level and adding the number of pixels at the next higher intensity level to the count, resulting in a current pixel sum; and repeatedly incrementing to the next higher intensity level and adding the number of pixels at the next higher intensity level to the current pixel sum;

the program uploading a static image to the web server when a difference between the minimum intensity level and a maximum intensity level at which the current pixel sum exceeds a certain percentage of all the pixels in the image is less than a predetermined threshold value; otherwise, the program uploading the image to the web server.

21. The web camera system of claim 20 wherein the certain number corresponds to a fixed percentage of all the pixels in the image.

* * * * *